(12) United States Patent
Iguchi et al.

(10) Patent No.: US 10,028,086 B2
(45) Date of Patent: Jul. 17, 2018

(54) TECHNIQUES FOR IMPLEMENTING LOCATION BASED DEVICE SERVICES

(71) Applicant: Kii, Inc., San Mateo, CA (US)

(72) Inventors: Makoto Iguchi, Toyko (JP); Phani Pandrangi, San Jose, CA (US); Susumu Ishizuka, Tokyo (JP)

(73) Assignee: Kii, Inc., San Mateo, CA (US)

( * ) Notice: Subject to any disclaimer, the term of this patent is extended or adjusted under 35 U.S.C. 154(b) by 0 days.

(21) Appl. No.: 15/046,359

(22) Filed: Feb. 17, 2016

(65) Prior Publication Data

US 2016/0241994 A1 Aug. 18, 2016

Related U.S. Application Data

(60) Provisional application No. 62/117,820, filed on Feb. 18, 2015.

(51) Int. Cl.
*H04W 60/00* (2009.01)
*H04W 4/02* (2018.01)
*G06Q 20/32* (2012.01)
*H04L 29/08* (2006.01)

(52) U.S. Cl.
CPC .......... *H04W 4/02* (2013.01); *G06Q 20/3224* (2013.01); *H04L 67/16* (2013.01); *H04L 67/18* (2013.01); *H04W 60/00* (2013.01)

(58) Field of Classification Search
CPC ........ H04M 2207/18; H04L 29/08657; H04W 4/02; H04W 64/00; G01S 5/02; G01S 5/0252
USPC ...... 455/414.1; 705/58, 63–64; 709/224–226
See application file for complete search history.

(56) References Cited

U.S. PATENT DOCUMENTS

| | | | |
|---|---|---|---|
| 7,945,251 B2 | 5/2011 | Jendbro et al. | |
| 9,300,787 B1 * | 3/2016 | Khameneh | H04M 1/72583 |
| 2007/0032247 A1 * | 2/2007 | Shaffer | H04L 67/18 |
| | | | 455/456.1 |

(Continued)

FOREIGN PATENT DOCUMENTS

EP 1170920 A1 1/2002

OTHER PUBLICATIONS

International Search Report and Written Opinion for PCT/US2016/018531, dated May 30, 2016, 11 pages.

*Primary Examiner* — Kamran Afshar
*Assistant Examiner* — Nicole Louis-Fils
(74) *Attorney, Agent, or Firm* — Kilpatrick Townsend & Stockton LLP

(57) ABSTRACT

The present disclosure generally relates to techniques for implementing location based device services. Techniques are described for enabling registration of a device to a server system and providing access to the registered devices via a universal application. In certain embodiments, the universal application may receive, from an end user, one or more location based search parameters for a registered device. The universal application may determine registered devices that satisfy the one or more location based search parameters. In some embodiments, service attributes can also be input when searching for a registered device. In addition, some embodiments determine a device application associated with the registered device and a corresponding device application can be launched upon selected of a registered device.

21 Claims, 9 Drawing Sheets

(56) References Cited

U.S. PATENT DOCUMENTS

| | | | |
|---|---|---|---|
| 2013/0073720 A1* | 3/2013 | Min | H04W 4/02 709/224 |
| 2015/0134546 A1* | 5/2015 | Penilla | G06Q 20/18 705/305 |
| 2015/0140933 A1* | 5/2015 | Muller | H04W 4/12 455/41.2 |
| 2016/0021039 A1* | 1/2016 | Woo | H04L 51/046 715/752 |

* cited by examiner

TECHNIQUES FOR IMPLEMENTING LOCATION BASED DEVICE SERVICES

CROSS-REFERENCE TO RELATED APPLICATION

This application is a non-provisional application and claims the benefit and priority of U.S. Provisional Application No. 62/117,820, filed on Feb. 18, 2015 titled "METHOD AND SYSTEM FOR IMPLEMENTING LOCATION ORIENTED INTELLIGENT THING SERVICES," which is herein incorporated by reference in its entirety for all purposes.

BACKGROUND

The present disclosure relates generally to techniques for providing location based services. In particular, the disclosure relates to determining devices and/or services that can be provided by the devices according to an identified location.

A user may be at a particular location and may want to know what devices and services offered by the devices are available in the particular location. For example, a person attending a baseball game may want to know what devices (e.g., vending machines, cameras, billboards, etc.) are in the baseball stadium or nearby their seat. For example, a user may want to know what vending machine is nearby that offers beverages and snacks for purchase and the types of beverages and snacks available.

However, in order for a user to determine what machines are in a particular location (e.g., baseball stadium), the user may have to look at a map of the stadium or may have to ask someone familiar with the stadium to determine what devices and services offered by the devices are available in the stadium. Further, even if a location of a device can be identified, the particular services offered by the devices may not be immediately known to the user until they arrive at the device.

BRIEF SUMMARY

The present disclosure relates to techniques for implementing location based device services. In particular, the disclosure relates to registering devices with a server based on their device and/or service information. Further, the disclosure relates to allowing an end user to search for a registered device according to search parameters input by the end user in order to access or manipulate the device and services offered by the device.

Some embodiments provide a universal application that enables an end user to interact with one or more devices registered by users and/or providers of the universal application. The universal application may allow users and/or providers to register one or more devices, including their locations, services and functionalities, and/or dynamic interfaces, to be used by others. Using the universal application, an end user or a client may search for a device that satisfies one or more parameters specified by the end user. The universal application may present a list of devices to the end user. Upon receiving a selection of a particular device from the end user, the universal application may invoke an application associated with the particular device and cause the application to be launched on the end user's device (e.g., mobile phone). The end user may then interact with the particular device using the application associated with the particular device.

In accordance with certain embodiments, a method enabling access to a device can include receiving, from a first end user device, information identifying a physical location; determining one or more devices associated with the physical location, receiving information, from the first end user device, identifying a first device selected from among the one or more devices, and enabling a first end user of the first end user device to interact with an application associated with the first device using the first end user device.

In certain embodiments, a method can include enabling one or more device providers to register the one or more devices, receiving device information associated with the one or more devices to be registered, the device information including a device identifier, a device location, and a device capability, and storing the device information in a device inventory.

In certain embodiments, a method can include providing cost information associated with each of the one or more devices, and receiving a payment via the application in exchange for a service provided by the selected first device.

In certain embodiments, a universal application can determine the one or more devices associated with the physical location and the universal application is configured to manage the one or more devices and one or more services associated with the one or more devices according to the physical location.

In some embodiments, the one or more devices associated with the physical location is determined according to stored mapping information.

In some embodiments, the mapping information maps a plurality of physical locations with a plurality of devices.

In some embodiments, the mapping information maps a device with one or more device applications for operating the device.

In some embodiments, the mapping information maps a device with one or more services offered by the device.

In some embodiments, the one or more device applications are managed by an application server.

In some embodiments, the information identifying the physical location includes search parameters input via a universal application operating on the first end user device.

In some embodiments, the search parameters include one of an address, a location name, and a point of interest.

In some embodiments, the one or more devices are registered intelligent computing devices.

In some embodiments, the information identifying the physical location includes one of an address, a location name, and a point of interest.

In some embodiments, the first device is selected from among the one or more devices by selecting a uniform resource locator (URL) of the first device.

In some embodiments, the application associated with the first device is launched in the first end user device upon selection of the of the first device from among the one or more devices.

In some embodiments, the enabling the first end user of the first end user device to interact with the application associated with the first device using the first end user device includes displaying a user interface for controlling the application on the first end user device.

In accordance with certain embodiments a method of enabling access to a device can include receiving, from a first end user device, information identifying a physical location, determining one or more devices associated with the physical location, receiving, by the server computing device from the first end user device, information identifying a service attribute, determining, from among the determined one or more devices associated with the physical location, one or more devices associated with the service attribute, receiving information, from the first end user device, identifying a first device selected from among the one or more devices associated with the service attribute, and enabling a first end user of the first end user device to interact with an application associated with the first device using the first end user device.

In some embodiments, the method can also include enabling one or more device providers to register the one or more devices, receiving device information associated with the one or more devices to be registered, the device information including a device identifier, a device location, and a device capability, and storing the device information in a device inventory.

In some embodiments, a system can include a memory, and one or more processors coupled to the memory and configured to receive, from a first end user device, information identifying a physical location, determine one or more devices associated with the physical location, receive information, from the first end user device, identifying a first device selected from among the one or more devices, and enable a first end user of the first end user device to interact with an application associated with the first device using the first end user device.

In some embodiments, the system can include one or more processor configured to enable one or more device providers to register the one or more devices, receive device information associated with the one or more devices to be registered, the device information including a device identifier, a device location, and a device capability, and store the device information in a device inventory.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
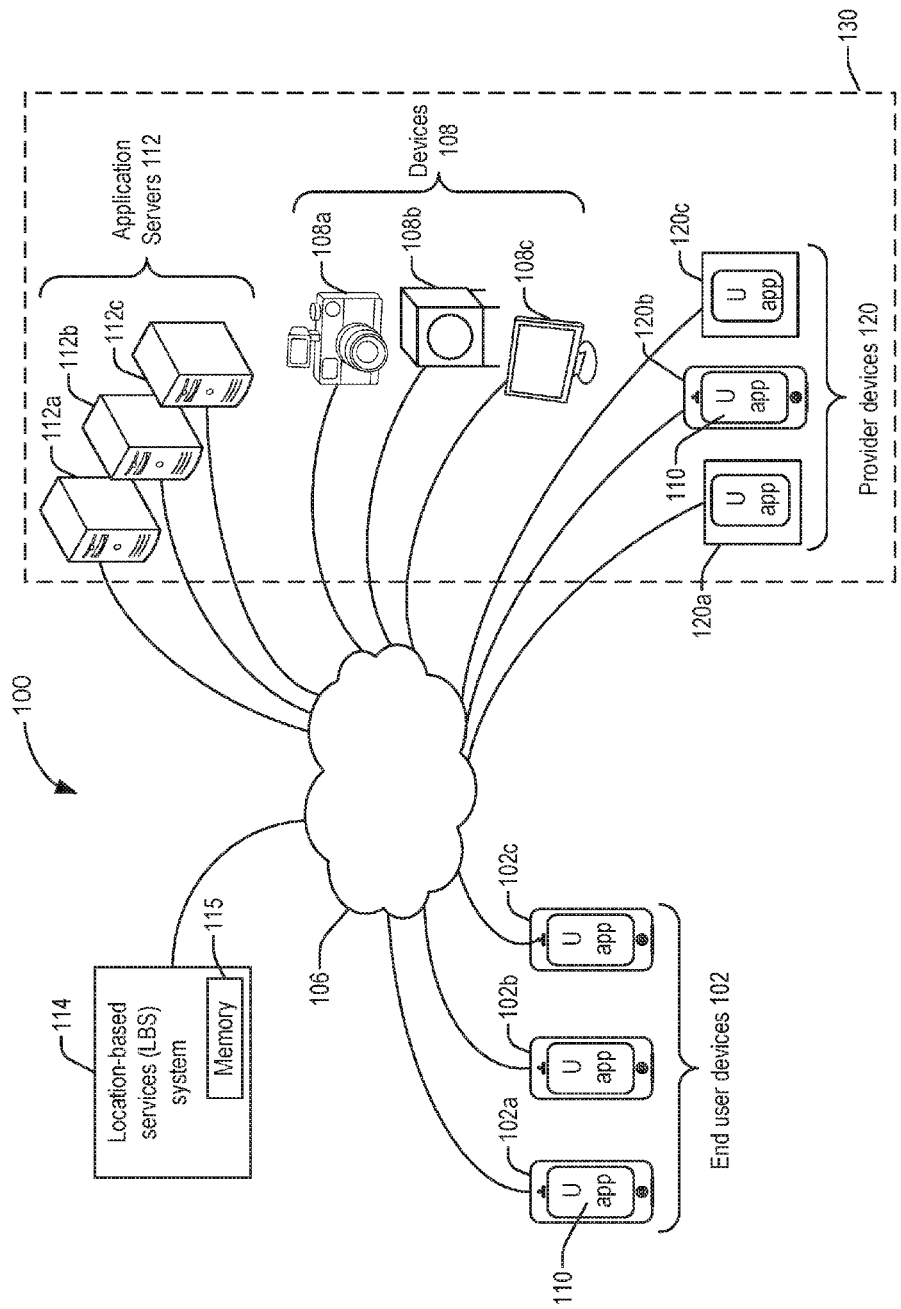
FIG. 1 shows a block diagram of a computing system in accordance with some embodiments.

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Some embodiments are directed to techniques (e.g., a system, a method, a memory or non-transitory computer readable medium storing code or instructions executable by one or more processors) for facilitating the registration of devices and for enabling users to gain access to these devices and their capabilities. The devices that are registered can also be called intelligent devices, computing devices, intelligent computing devices, networked devices or smart devices. An intelligent device can be any type of equipment, instrument, or machine that has its own computing capability. Devices that can be registered can include, for example, vending machines, billboards, televisions, cameras, mobile phones, scoreboards, or any device that can be used in an Internet of Things (IoT) network. These devices are merely examples and the exemplary embodiments are not limited to these devices.

A user that registers a device can be called a provider, device provider, service provider, vendor or registrant. Further, a user who accesses a particular one or more devices and services offered by devices can be called an end user, a client, or a customer. A user that provides a device that is registered can also be a user of the devices that are registered in the system. Therefore, a user, provider and end user may be referring to a same person or may be different people.

In some embodiments, a system may provide a platform for various devices to be registered by a multitude of providers of the system. Some embodiments provide a universal application that allows providers to register a device along with information about the device such as the device location, device capabilities, and/or a web application or mobile application associated with the device. The universal application may also enable end users to search for registered intelligent devices near a location and to utilize the resources provided by the intelligent devices. The end users may operate and access the desired intelligent device around a location and the desired capability using a software application or dynamic interface associated with the device in some instances.

Various devices can have networking-capabilities such that they can be interconnected with each other via a network. The devices can be aware of their current position or location (e.g., at a corner of a floor in a building, upstairs at home, in the office, facing a direction, etc.). A device location can be programmed in the device and reprogrammed when the location of the device changes. The location of the device may have been set when a user was installing the device at home and pairing it with an application. Some embodiments enable a server to maintain location information about devices. For example, a server can maintain mapping information of devices in geographical locations and the services offered by the devices.

Some embodiments provide a universal application that enables a user to search for networking-capable (also referred to as registered or networked) devices based on a location and/or based on their functionalities/capabilities. A user can search for a location (e.g., a future destination, a current location, location of interest, etc.), and the universal application may present the networking-capable devices within the area. For instance, the user may search for Golden Gate Bridge and find whether there is a camera, a vending machine, a printer, etc. within a threshold radius (e.g., 10 miles) of the point of interest. The devices may not necessarily be part of businesses, but may be owned by individuals who are interested in sharing the capabilities of their devices with a system of networked devices. Further, the devices can be owned by a single business or owner or can be owned by different business and owners.

Further, the user does not need to be currently located at the location that is being searched. For example, a parent who is at home can search for a vending machine offering food for their child who is at a baseball stadium. Therefore, an end user does not have to at a particular location in order to determine devices and services that are available at a particular location.

In some embodiments, a device may be initialized and connected to a location. A provider may register a computing device with the system and associate the computing device with a location. While registering the device, the provider may specify the device's capabilities, such as picture-taking or filming. In one example, if the computing device is a vending machine, the device can identified as providing goods and can also identify the specific goods and brand of goods offered by the vending machine. The vending machine may have an associated user interface (e.g., a mobile application or a web application) that can present or display, for example, on the end user's device (e.g., mobile phone) a list of items that are available for purchase on the vending machine and the pricing information of the items.

In some embodiments, the end user may perform a search on the universal application to identify potential devices within an area. Certain embodiments enable a provider to register a computing device by specifying its location, its capabilities, and in some instances, its potential end users for whom such information should be broadcast. An end user of the universal application may then search for a device when the user is within, for example, a designated distance from the device.

For example, a user may walk around a mall and determine the devices around the user by performing a search on a universal application (e.g., on the user's mobile phone). Through the devices registered with the system, the user may find a vending machine that is within a designated distance (e.g., 5 minute walk, 0.3 miles, next to a particular store) of the user.

In another example, a user may be at a stadium (e.g., football, baseball, soccer, etc.) and the stadium may have a smart billboard that can be rented out. The smart billboard may advertise that it can display personalized messages (e.g., "Will you marry me?," "Happy Birthday Bob," etc.) if a user pays a requested price (e.g., $100). Using the universal application, a user can search for a billboard in the stadium and determine services of the billboard that are available to the end user.

In yet another example, the user may search for a printer at an airport and send the print job remotely using a universal application. The user may be, for example, in a vehicle on their way to the airport or may be currently in the airport. After engaging the printer's services, the user may pick up the print job after arriving at the airport or upon arriving at the location of the printer. In another instance, the user may be going to a location for a meeting and searches for the location. The user may determine that there is a camera pointing at the cross street of the location and may engage the services of the camera to take a picture of the cross street. Upon receiving the photo, the user may review and learn the area and may also use the photo or series of photos to determine current traffic conditions. The photos can be obtained for a current time or a particular time as requested by a user. For example, a user may have an appointment on a Wednesday at 9 am, and a week before their designated appointment can use the camera to obtain photographs or video images for a particular day and/or time. In another instance, the user may desire to find parking in a certain area. The user may search for parking meters or parking lots including public and private parking areas and reserve the parking spot for a particular time slot. The above are merely examples many other devices and services can be obtained in accordance with the embodiments.

Some embodiments can provide a service that allows providers to register devices with a system and providers can specify users who are permitted to gain access to particular operations that can be performed by the device. Therefore, a particular device can have different access levels. The service may allow users to populate a database with points of interest (e.g., Golden Gate Bridge) and/or devices to be associated with points of interest, along with services offered by the devices. With this database of locations, devices, and/or services, the system in some embodiments provides a search mechanism where a user may perform a location based search to identify devices at a location (e.g., landmark, address, name of destination, etc.) or a services search where a user may identify devices with certain functionality or offering particular services. This enables users to leverage resources (e.g., services, functionalities) that are not necessarily owned by the users themselves but are shared by others (e.g., persons or entities, public or private).

FIG. 1 shows a block diagram of a computing system 100 in accordance with some embodiments. Computing environment 100 can include one or more end user devices 102 (e.g., a mobile phone on which a universal application 110 is installed). For example, there can be a plurality of end user devices 102a, 102b, and 102b belonging to different users or a same user that want to access devices and services available via the universal application.

End user device 102 may be of various different types, including, but not limited to a personal computer, a desktop, a mobile or handheld device such as a laptop, a mobile phone, a tablet, etc., and other types of devices. There may be one or more applications accessible to a user via end user device 102. In certain embodiments, end user device 102 can have a universal application 110 stored and/or running on end user device 102. In some embodiments, universal application 110 may enable an end user to search for one or more registered devices (e.g., registered devices 108) according to, for example, a particular location or by specifying desired capabilities or parameters of a device 108 and universal application 110 can identify devices 108 that would meet the parameters as specified by the end user. Although a universal application 110 is described, embodiments are not limited to the universal application 110 and some embodiments can include a service that provides a universal service and access to one or more devices in a system.

The end user devices 102 can be communicatively coupled to a location based services (LBS) system 114 and one or more application servers 112 via a communication network 106 (e.g., the Internet). The LBS system 114 can include one or more LBS system servers. An LBS system server can also be known as a backend server or an aggregator server. LBS system 114 can store information regarding registered devices 108, services offered by registered devices 108 and information mapping devices 108 to applications in application server 112. Further, LBS system 114 can store information regarding a particular registered device and its corresponding services. LBS system 114 can receive requests and perform actions (e.g., serve content) in response requests.

LBS system 114 can store information regarding physical devices in a physical location. The LBS system 114 may store the registered information of the registered device 108 in data storage such as a database or a memory 115. The database or a memory 115 can store the device information in, for example, a device inventory. The database or a memory 115 can be part of the LBS system 114 or can be separate from the LBS system 114.

An LBS system provider can provide the LBS system 114 and the universal application 110. The universal application can be downloaded and executed by an end user device 102 or a provider device 120.

The one or more application servers 112 can include, for example, application servers 112a, 112b, and 112c. A registered device 108 may be managed by a particular application server 112 or different businesses may each have an application server 112 managing applications offered by their devices. Application server 112 is a server that is providing the application for a registered device 108 to for example, a mobile phone of an end user. The application server 112 is the server on which an application for a registered device 108 is running and/or stored.

In some embodiments, multiple devices 108 may be registered with LBS system 114 via network 106. Therefore, resources provided by, for example, devices 108a, 108b, 108c, which can correspond to different types of devices, can be registered. Devices 108 can be of various different types, including, but not limited to a monitor, a video camera, a printer, an audio speaker, a thermostat, a camera, a smoke alarm, a computer, a television, a radio, a billboard, a vending machine, a charging station, a broadcasting device, lighting devices, etc. Although a device is called a registered device, this is for purposes of clarity in the description and to distinguish the different devices in system 100. A registered device 108 may not yet be registered with the system 100 even though it is identified as a registered device.

The computing system 100 can also include one or more provider user devices 120 (e.g. 120a, 120b, 120c). A provider user device 120 can be, for example, a mobile phone or any device (e.g., laptop) used by a provider of a registered device 108 to register a registered device 108 to the LBS system 114. A provider user device 120 can also include an instance of universal application 110, which the provider can use to register one or more devices 108 with LBS system 114.

In some embodiments, registered devices 108 are among several devices that have been registered by multiple providers. The providers can be users who have downloaded the universal application and desire to make their devices available to others. A provider may include multiple persons or entities that are unrelated or unaffiliated (e.g., do not fall under a same company).

Application servers 112, registered devices 108 and provider user devices 120 can make up, for example, provider elements 130. That is, application server(s) 112, registered device(s) 108 and provider user device(s) 120 can belong to one or more providers of one or more devices 108.

Communication network 106 facilitates communications between one or more end user devices such as end user device 102 and LBS system 114. Communication network 106 can be of various types and can include one or more communication networks. For example, communication network 106 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 106 may include any communication network or infrastructure that facilitates communications between one or more end user devices, such as end user device 102, LBS system 114, and one or more application servers 112 in the system 100.

The embodiment depicted in FIG. 1 is merely an example and is not intended to unduly limit the claimed embodiments. One of ordinary skill in the art would recognize many variations, alternatives, and modifications can be made to the example shown in FIG. 1. For example, although applications servers 112 are shown separate from LBS system 114, application servers 112 can also be part of LBS system 114.

Different embodiments may include additional or fewer servers for performing various actions. A device provider may upload a WebApp or mobile application (also referred to as DeviceApp) on their respective one or more application servers 112. Specifically, a device provider can upload applications for devices on their own application server 112 and a device provider can have more than on application server 112.

Upon determining that an end user would like to interact and utilize resources provided by a device (e.g., registered device 108), LBS system 114 can determine an associated application from application server 112 and provide access to the associated application. The user may then specify the desired service or computing resources of a device (e.g., registered device 108) by using the associated application.

LBS system 114 can provide device registration and management. The device provider may register a device to become part of the LBS system 114 by accessing, for example, an LBS system server of LBS system 114. In certain embodiments, a provider may register one or more devices with LBS system 114 via a mobile application (e.g., universal application 110). In some embodiments, LBS system 114 can store the device information in its device inventory in a way that the device information can be queued by its location and service attribute. A provider may also specify device availability, device capabilities, any additional mobile applications or plugins necessary for an end user to download in order to access the functionalities of a registered device 108, etc. For example, the provider may specify that a particular device is available only during weekends between 8 AM until 5 PM, and/or accessible to a subset of people who have a certain level of security clearance.

In certain embodiments, universal application 110 may receive a search from an end user for one or more devices 108. The end user may specify one or more parameters in the search for the registered device 108, such as a location of a device or one or more capabilities of a device. Universal application 110 may access LBS system 114 via network 106 and request device information (e.g., list of devices) that satisfy the search parameters. For example, universal application 110 (e.g., that is on an end user device) may request a list of device names that are near a location. LBS system 114 may then query the device inventory maintained by LBS system 114 and obtain the list of all devices and corresponding information that belong to the selected location and can send the information to universal application 110 on the end user device.

Universal application 110 may present, for example, a list of devices (e.g., devices 108) that satisfy the one or more parameters specified by the user. The list of devices and their capabilities may be displayed to the user via an interface on end user device 102. The search result information, including an arrangement and display of the device information, the number of devices displayed, and the type of device information displayed can be selected and modified as desired by the end user. In some embodiments, universal application 110 allows the end user to further narrow the search by inputting additional parameters. Universal application 110 may then repopulate or further narrow the list of devices in the search result. In some embodiments, additional relevant information may be presented to the end user along with device identifying information. For example, universal application 110 may also indicate a price or a cost associated with using services associated with the devices. In some instances, universal application 110 may also present information such as the resolution of various recording devices that would enable a user to select the desired device based on a desired device specification.

Upon receiving a selection of a device (e.g., registered device 108) from the list of devices, universal application 110 may identify a device application associated with the selected device. In certain embodiments, the device application associated with the device may be universal application 110. In some embodiments, the device application may be a separate mobile application. In certain embodiments, universal application 110 may determine and access a universal resource locator (URL) of the selected device (e.g., from application server 112) to launch a device application on an end user device 102. The end user may then send instructions to device (e.g., registered device 108) via the device application for the device.

After an end user has entered particular location search criteria using universal application 110, an end user device 102 may be provided with a URL for an application that runs a particular registered device 108. When the end user selects the URL, the end user device can be connected to an application server 112 and can access an application for controlling the registered device 108 that is running on an application server 112.

In addition, a provider can also register a registered device 108 using universal application 110. A provider can, for example, open up the universal application 110 on a provider device 120 and the provider can select device registration on an interface on the provider device 120 according to the universal application 110. The device information and services that is registered by the provider can be sent to LBS system 114 via the universal application 110 and the information can be stored by LBS system 114.

Figure 2:
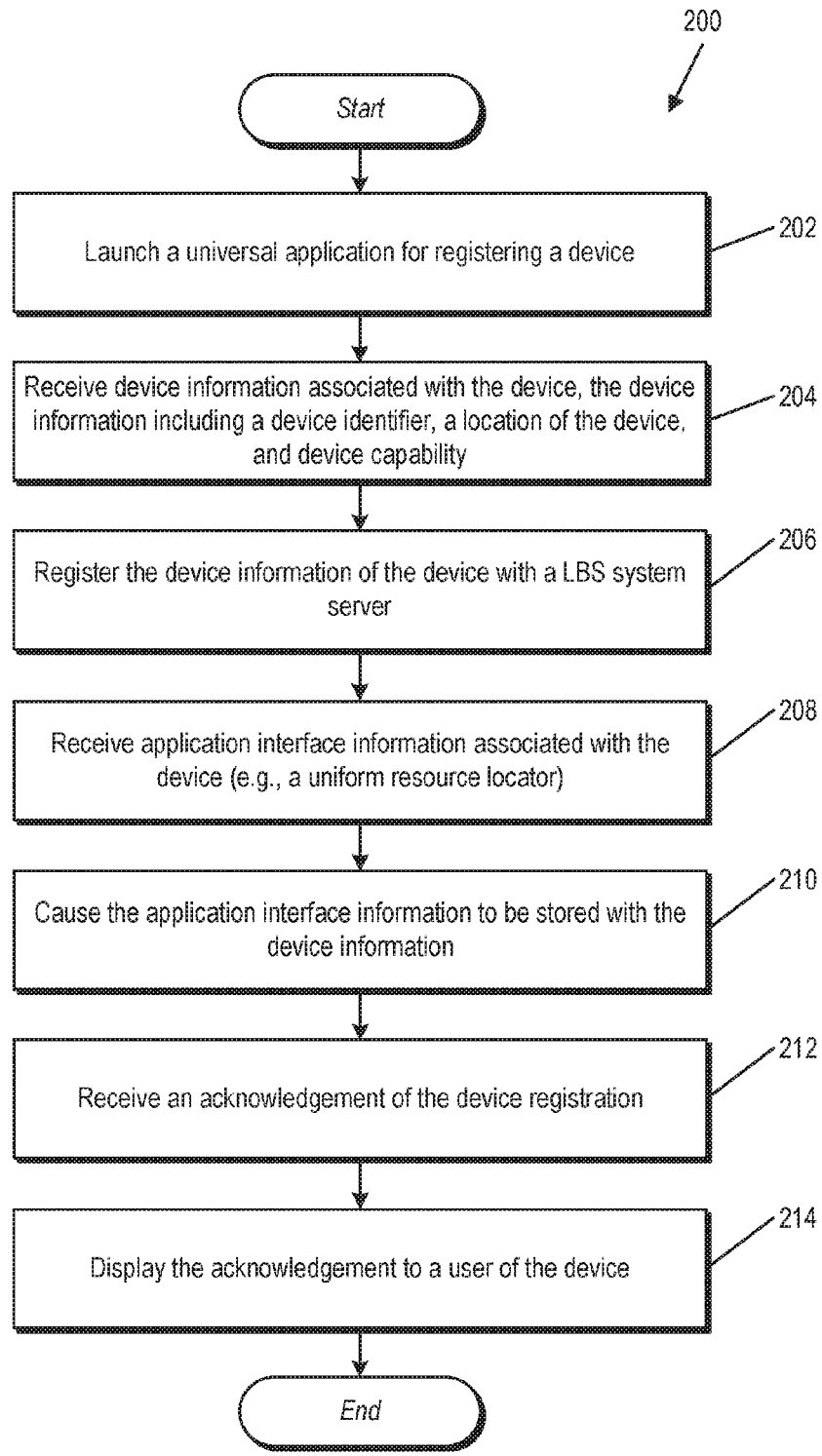
FIG. 2 illustrates a flowchart for a method of providing an application enabling registration of a device in accordance with some embodiments.

FIG. 2 illustrates a flowchart of a method 200 of providing an application for enabling registration of a registered device 108 with the system 100 in accordance with some embodiments. In certain embodiments, method 200 can be performed by one or more devices such as provider user device 120. In some embodiments, the system 100 may facilitate the registration of registered devices 108 and enable end users to gain access to the registered devices 108 and their capabilities. For each device 108, a universal application (e.g., universal application 110 in FIG. 1) can provide an interface that enables an end user or provider to search for or register devices (e.g., registered devices 108). The provider may also upload a web application or a mobile application (also referred to as device application) for the registered device 108 on an application server 112. The web application or the mobile application may enable end users who desire to access and utilize a registered device's functionalities to send instructions or interact with the registered device 108.

Upon registering the device, end users of universal application may be able to search and find the registered device 108. In some embodiments, an end user may search for a location and find registered devices 108 of interest. In one instance, the end user may find a vending machine near a searched location and may desire to see the contents of the vending machine.

At block 202, a universal application (e.g., universal application 110) can be launched on the provider's device 120. Universal application 110 can be, for example, downloaded to the provider's device 120 and can be used by the provider to register a registered device 108. The universal application 110 may be a mobile application running on the providers computing device 120 and can be launched via a web browser in order to register a registered device 108. The universal application 110 may be made available to private or public entities or individuals that have networking-capable devices to share with the public. Oftentimes registered devices 108 may not be consistently utilized or not utilized to their full capacity. The universal service of some embodiments enables people to loan out services or functionalities that can be provided by a registered device 108. Therefore, devices 108 can be more consistently used and access can be provided to different people. Further, the existence of such devices can be more easily known to an end user.

At block 204, in response to the provider choosing to register a registered device 108 via the universal application 110, device information associated with the registered device 108 that is to be registered with the LBS system 114 can be provided by the provider. The device information can include a registered device identifier, a location of the registered device, and a registered device service. Different embodiments may require the provider to register different sets of information. In some embodiments, the amount of information to be registered for a registered device 108 may depend on the type of registered device 108 being registered. For instance, the system 100 may require a provider to register a brand, a model, and a resolution for a camera.

At block 206, the device information that was received in block 204 for the registered device 108 can be registered with an LBS system server of LBS system 114. The LBS system may store the registered information of the registered device 108 in data storage such as a database or a memory 115. The database or a memory 115 can be part of the LBS system 114 or can be separate from the LBS system 114. The LBS system 114 can store information mapping a registered device 108 to particular service, mapping a registered device 108 to a particular location, and/or mapping a service to a particular registered device 108 and/or location.

At block 208, application interface information associated with the registered device 108 (e.g., a URL) can be provided by the provider. For example, a URL can be provided that directs an end user device 102 to the web application or mobile application of a registered device 108. A provider may create a mobile application or web application for the registered device 108 to facilitate interaction between a potential end user using an end user device 102 and the registered device 108.

The web application or mobile application created and registered by the provider may enable end users to select an operation of the registered device. In some embodiments, the application interface may be loaded upon user selection of the desired operation for the device.

The application programming interface (API) for the registered device 108 can be exposed to developers to allow the developers to create a dynamic interface for the registered device 108. The provider, developer, or a vendor may create a dynamic user interface and register the dynamic user interface with the registered device 108 and/or with the service provided by the networked device. For instance, the registrant or the vendor may upload the dynamic user interface for a vending machine that displays the list of contents. The mobile application or web application for the registered device 108 can be used by the end user device 102 to, for example, control and access a registered device 108.

At block 210, the application interface information that was received in block 208 can be stored with the LBS system 114 along with the device information that was received in step 204. For example, the application interface information can be stored in database or a memory 115 of LBS system 114. In some embodiments, a URL that may direct an end user to an application that sends instructions to registered device 108 can be stored with device information for the registered device 108.

At 212, a provider can receive an acknowledgement of the device registration. That is, if all of the information necessary for registering a particular registered device has been received and a corresponding application for operating the registered device has been received, then the provider can be notified that registration of the registered device 108 is complete. Although the example described above is with respect to registered a single registered device 108, a provider can register multiples devices or all of the provider's devices at a single time.

At 214, an acknowledgement of successful registration of a device can be displayed on a provider user device 120. Alternatively, if registration is not successful, a provider can be notified that registration of a registered device 108 was not successful. This completes the registration of a registered device 108 that is, for example, available for public use or available to users of the universal application 110.

Figure 3:
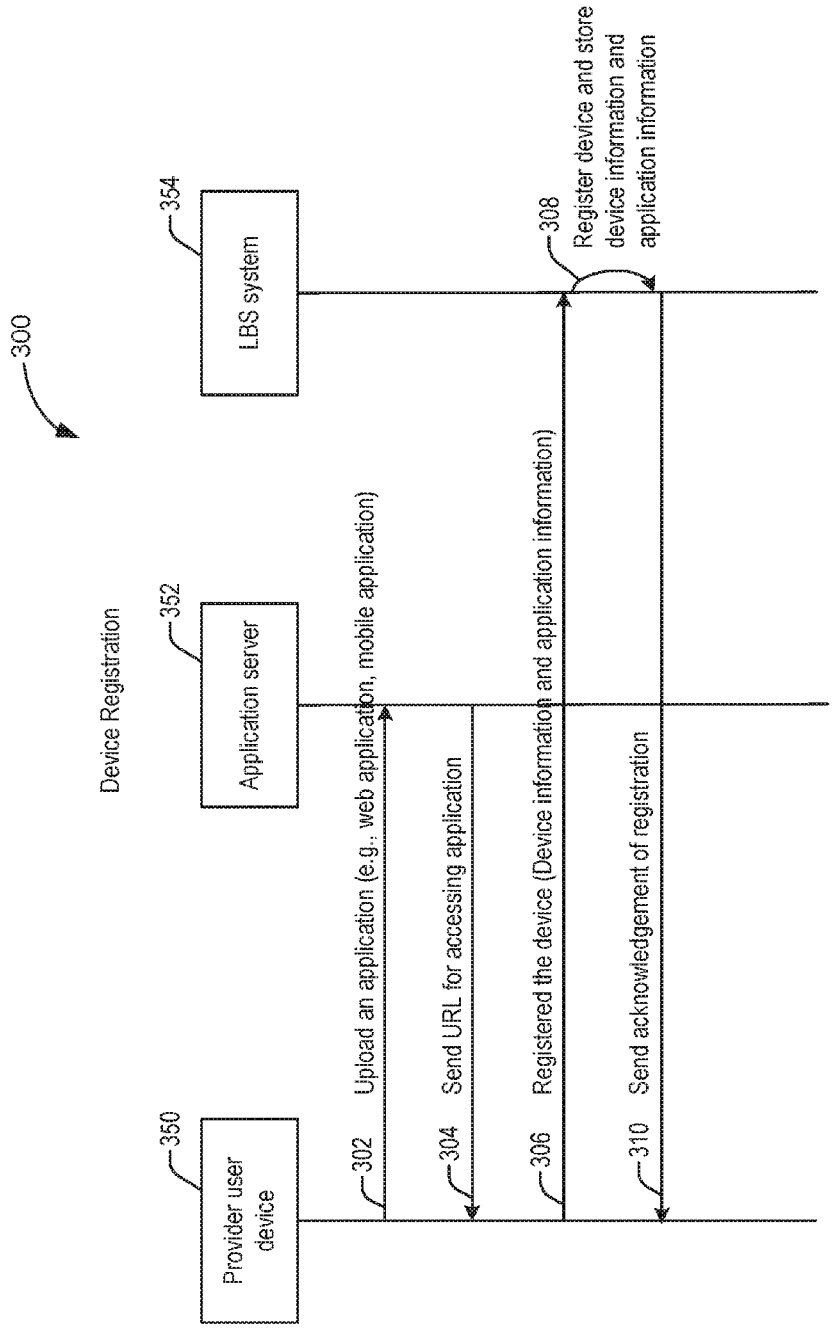
FIG. 3 is a sequence chart illustrative of process for device registration with a universal application in accordance with some embodiments.

FIG. 3 is a sequence chart illustrative of process 300 of some embodiments for device registration using a universal application. A provider device 350 can be used to register a registered device 108, via for example, a universal application 110, with a location based services (LBS) system 354. Information regarding an application for interacting with the registered device 108 can be stored in an application server 352. Provider user device 350, application server 352, and LBS system 354 can correspond to, for example, provider user device 120, application server 112, and LBS system 114 of FIG. 1.

Once a registered device 108 has been registered with a universal service for example via a universal application (e.g., universal application 110 in FIG. 1), end users of the universal application 110 may view the registered devices 108 and services provided by the registered devices 108 and use the services available on a registered device 108.

At step 302, a provider user device 350 that is operated by a provider of a registered device 108 can upload an application such as a web application or a mobile application (also referred to as device application) for the registered device 108 on an application server 352. The provider user device 350 may create an application for a registered device 108 that the provider desires to share or make available to end users of the universal application 110. The application can facilitate interaction between an end user and the shared, networked registered device 108. For example, if a provider desires to provide access to a billboard at a stadium, the device application for the billboard can be uploaded to an application server 352.

At step 304, application server 352 may send a URL for accessing the application for the registered device 108 to provider user device 350. At 306, provider user device 350 may register the device with LBS system 354 (e.g., with an LBS system server of LBS system 354). Provider user device 350 may submit device information such as device identifier, capability information, etc. in registering the device. Provider user device 350 may also submit the URL for accessing the application to LBS system 354.

In this example, the device provider or user registers a device by accessing the LBS system and sending the following device information: name of the device (e.g., "Billboard"), location to which it belongs (e.g., the Dodger's stadium), service attribute that summarizes the device capability (e.g., board message service), service description of the device capability (e.g., "Place your personal message on the stadium billboard, only for $100."), and URL to launch/download the associated device application.

At step 308, LBS system 354 may register the registered device 108 and store the device information in, for example, a device inventory that is stored in a memory or database of LBS system 354. The device inventory may be data storage. In some embodiments, the device information may be stored in a way such that the device information can be queued by its location and service attribute. At step 310, LBS system 354 may send an acknowledgement of the device registration to provider user device 350. Alternatively, if registration is not successful, LBS system 354 may inform provider user device 350 that registration was not successful and/or additional information is required.

Figure 4:
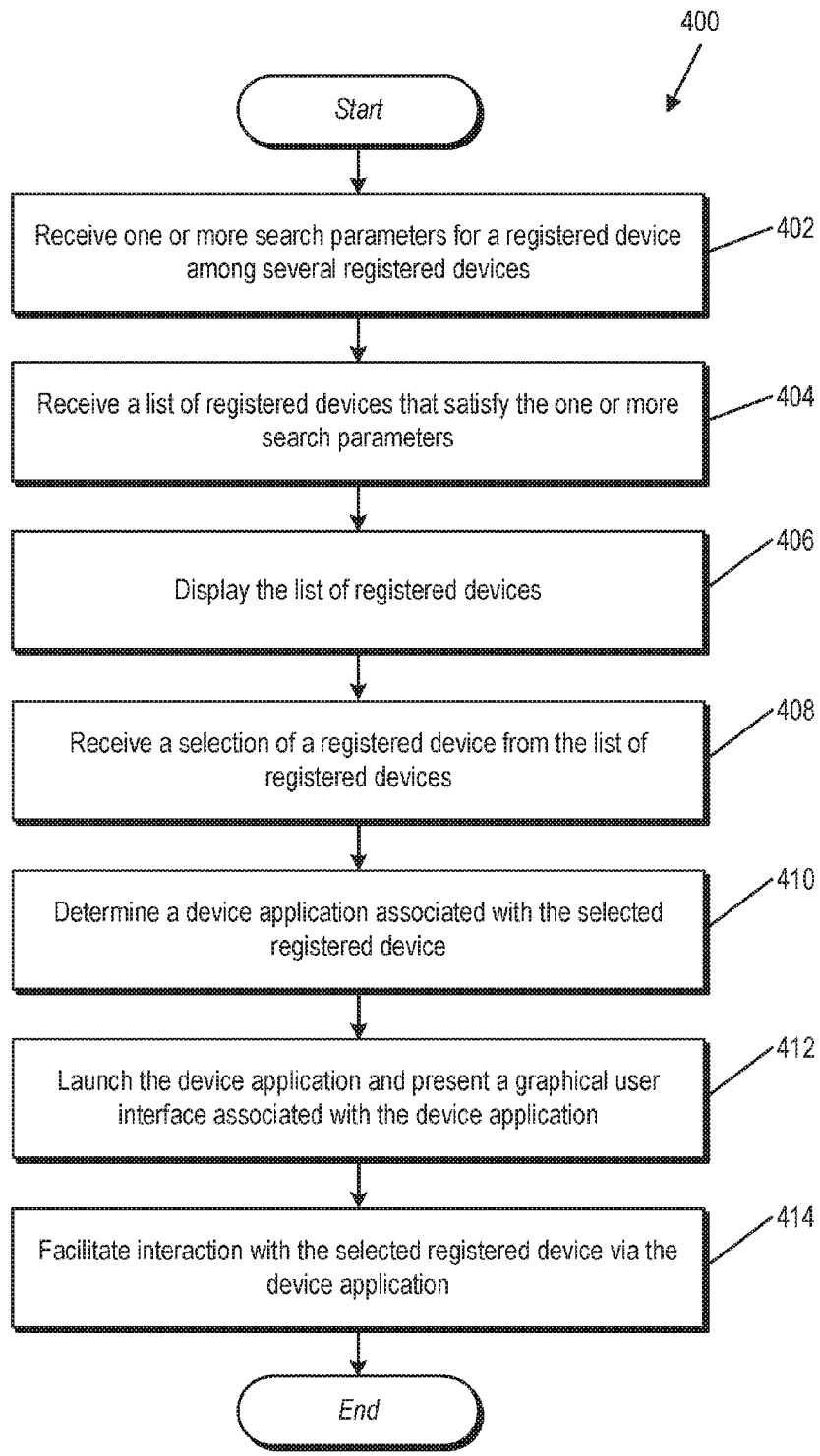
FIG. 4 illustrates an example process of enabling an end user to access a registered device and utilize functionalities of the registered device in accordance with some embodiments.

After a registered device 108 has be registered with the LBS system 114, the registered device 108 can be accessed by users of the system 100. FIG. 4 illustrates an example method 400 of enabling an end user to access a previously-registered device and utilize its functionalities in accordance with some embodiments. In certain embodiments, method 400 can be performed by an end user device 102, as shown in FIG. 1. In some embodiments, the system 100 may facilitate the registration of registered devices 108 and enable users to gain access to registered devices 108 and their capabilities. In response to receiving a search request from an end user for a registered device that satisfies one or more parameters specified by the end user (e.g., near a location, has certain capabilities, provides certain services), the system 100, via for example, LBS system 114, may populate a list of registered devices 108 that satisfies the one or more parameters and enable the end user to make a selection from among the list of registered devices 108 provided to the end user. In some embodiments, the list of devices may be populated by using a database storing device information for various devices registered by various people (e.g., database 115).

At block 402, a user device 102 can receive one or more search parameters for a registered device among registered devices 108. In some embodiments, an end user of a registered device may desire to search for one or more registered devices. The end user may launch a universal application on the user's end user device 102. Using the universal application 110, the end user may input one or more search parameters such as a location, desired functionalities or service(s), or a device identifier to search for the desired registered device. For example, the end user may desire to use a printer in the vicinity of a particular location. In another example, the end user may desire to use a camera at a certain traffic intersection. In another example, the end user may desire to use a stadium billboard that has a certain functionality, such as broadcasting to the audience. Additional search parameters may include a time, duration, a date, etc. in which the end user would like to use the registered device 108.

At block 404, the end user device 102 can receive a list of registered devices 108 that satisfy the one or more search parameters. The end user device 102 may receive the list of registered devices 108 satisfying the search parameters from LBS system 114. In certain embodiments, the LBS system 114 may query the device inventory that stores all of the device information associated with the registered devices 108 that have been registered with system 100. The LBS system 114 may obtain the list of all devices that satisfy the specified parameters by identifying the registered devices 108 that have device information matching the specified parameters. For instance, if the specified parameter is a particular location, the LBS system 224 may determine all of the registered devices 108 that have device information specifying that the registered device 108 is at the particular location.

At block 406, the end user device 102 can display the list of registered devices that satisfy the end user search parameters on a user interface of the end user device 102. Upon receiving the list of computing devices that satisfy the one or more parameters from LBS system 115, the user end device 102 can display the list of registered devices to the end user through the universal application 110. The end user may then review the list of registered devices 108 to determine which registered device 108 the end user desires to use.

At block 408, the end user device 102 can receive a selection of a registered device from the list of registered devices. The end user may select a desired registered device from the list of registered devices via, for example, a touchscreen or user interface of the end user device 102. In some embodiments, the universal application 110 may display additional information pertaining to each registered device 108 in order to facilitate the user's selection process. For example, the universal application 110 may display cost information associated with functionalities of a registered device. The universal application may also display availability information (e.g., time information, restocking information) that indicates when the registered devices or the services of the devices are available. Other additional information may include specifications associated with the registered devices, such as a resolution of a camera, a volume capacity of a broadcasting speaker, a charging capability of a charging station, etc. Limitations (e.g., availability, capacity) of the computing devices may also be available and presented to the end user.

At block 410, a registered device application associated with the selected registered device can be determined. In some embodiments, the end user may interact with the selected registered device via the universal application 110. In certain embodiments, the registered device 108 may have a separate mobile application or a web application associated with the computing device. The mobile application end user or web application may facilitate the end user's interaction with controlling or manipulating the registered device 108. The mobile application or web application may have been previously created by the provider of the registered device and uploaded by the provider when making the registered device 108 available to end users. The mobile application or web application may be customized to the particular registered device 108. Upon receiving an indication that a particular registered device 108 has been selected by an end user, the universal application 110 may retrieve a uniform resource locator (URL) associated with the networked device. In some embodiments, the LBS system 114 may retrieve the URL stored along with other device information in the device inventory stored in, for example, memory 115 of LBS system 114, upon receiving an indication that the particular registered device 108 has been selected.

At block 412, an application associated with the selected registered device 108 (e.g., device application) can be launched and a graphical user interface associated with the application for the registered device can be displayed on the end user device 102. In some embodiments, the end user device 102 may download and install the application for the registered device on the end user device 102. The application for the registered device can be a mobile application in certain embodiments. The end user device 102 may then launch the application for the selected registered device after installing the application for the registered device. In some embodiments, the application for the registered device may launch automatically after the end user device 102 receives an indication from the end user to install the application for the registered device 108. The application for the registered device 108 may present the end user with a user interface and may prompt the end user to register (e.g., login) for the application or to enter user information. Some embodiments may skip the registration process and allow the end user to immediately specify the end user's request with respect to the registered device on the application for the registered device 108.

At block 414, interaction can proceed between the end user device 102 and the selected registered device 108. In response to receiving a selection for a registered device 108, some embodiments may launch the associated device application and present a web interface associated with the registered device to enable the user to access functionalities of the device. For instance, the device may launch a billboard application that allows the user to specify the exact action that the user would like the particular device, in this instance, the billboard, to perform. The end user may specify the words that the end user would like the billboard to display and at what time. In another instance, the registered device 108 may launch a vending machine application that allows the end user to review the contents of the vending machine and more detailed information regarding each of the items for sale or available on the vending machine. The application for the registered device 108 may also enable the end user to make a payment in exchange for the services requested by the end user.

Figure 5:
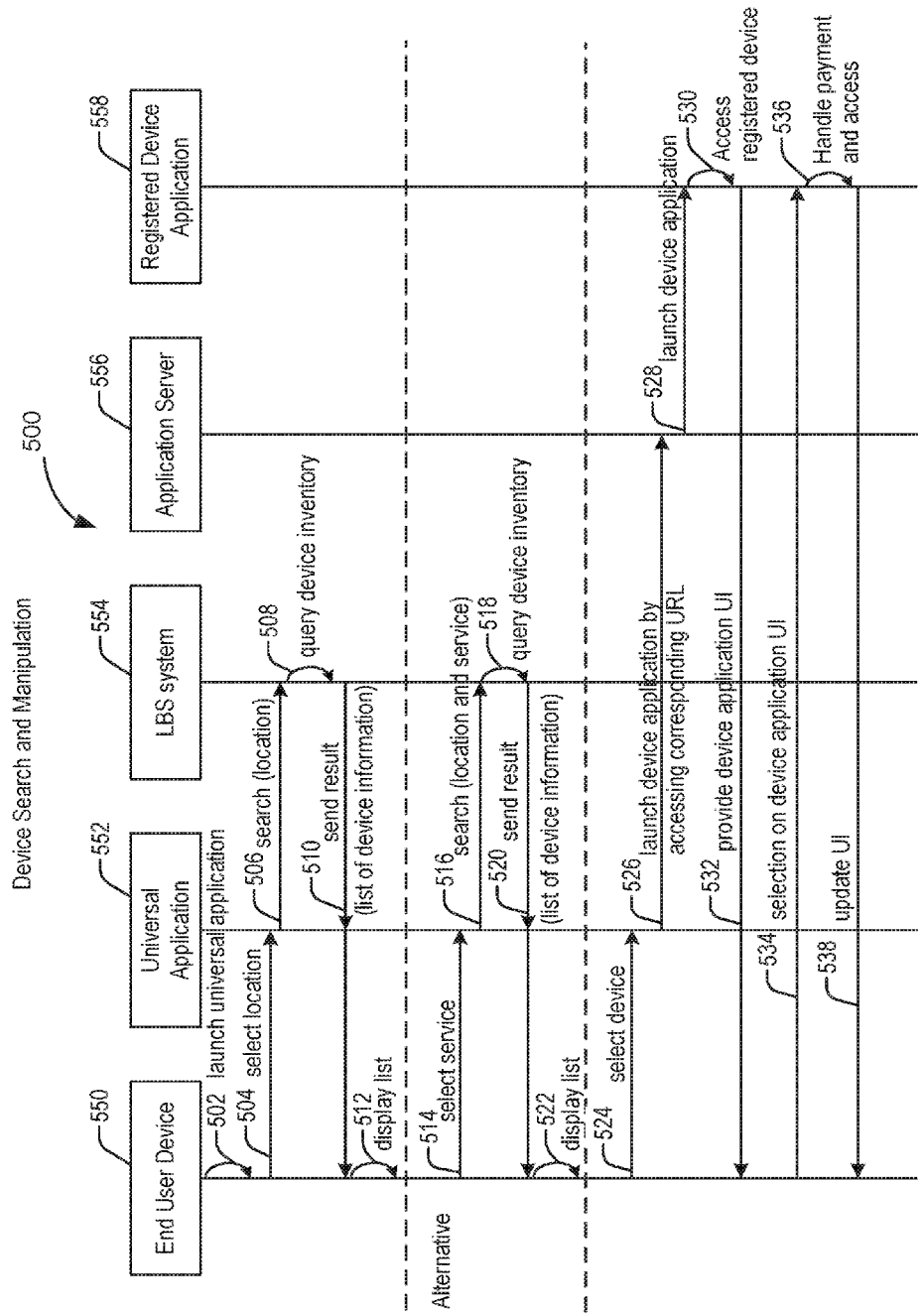
FIG. 5 is a sequence chart illustrative of process for device search and manipulation in accordance with some embodiments.

FIG. 5 is a sequence chart illustrative of a process 500 of some embodiments for device search and manipulation. As described, a universal application (e.g., universal application 110 in FIG. 1) may enable an end user to search for a registered device (e.g., registered device 108 in FIG. 1) that satisfies one or more parameters specified by the end user and cause the registered device 108 to perform one or more actions using functions of the registered device that are available to the end user.

FIG. 5 includes an end user device 550, a universal application 552, a location based services (LBS) system 554, an application server 556, and a registered device application 558. End user device 550, universal application 552, LBS system 554, and application server 556 can correspond to, for example, end user device 102, a universal application 110, LBS system 114, and application server 112 of FIG. 1.

At step 502, an end user launches universal application 552 on the user's end device 550 (e.g. mobile phone). At step 504, the end user device 550 selects a location on a list or map or specifies a location (e.g., address, name of location, etc.) in a search field of the universal application as to where the end user desires to search for a registered device 108. For instance, the end user device 550 may enter a search for a registered device 108 at a particular stadium by inputting the name of the stadium into a search box on the universal application's interface. Alternatively, the end user my select a particular location on a geographical map.

The universal application 552, running on the end user's device 550, receives the specified parameter, in this instance, the location parameters. At step 506, the universal application 552 accesses LBS system 554 (e.g., an LBS system server of LBS system 554) and requests a list of all device information that belongs to the selected location.

At 508, the LBS system 554 queries a device inventory that is stored in, for example, a memory of LBS system 554 or in a memory of an LBS system server of LBS system 554, and obtains the list of all device information that satisfied the selected location parameters. In some embodiments, the LBS system makes this determination by matching tags associated with devices in the device inventory storage with the specified criteria. The devices that have tags (up to a threshold variability) matching the criteria are aggregated into a list. Additional information on the devices such as any limitations on the services that the devices can provide and costs associated with the services can also be retrieved. In some embodiments, information on the devices can be dynamically retrieved by pinging servers servicing those devices to ensure that the user has updated relevant information on the devices before the user makes a selection on the device and/or service.

At step 510, LBS system 554 sends the list to the universal application 552 which is running on the end user device 550. At step 512, a list of registered devices is presented to the end user device 550 via the universal application 552 and displayed on the end user device 550.

At steps 514 to 522, optionally, a similar sequence from steps 504 to 512 can be conducted using different and/or additional search criteria to narrow down the device search further. In this example, the search criterion can include service attributes. At step 514, the end user device 550 can be used to input service attributes and the universal application 552 receives the service attributes as additional criterion in narrowing down search results for device information. At step 516, the universal application 552 sends the additional search criterion (sometimes in conjunction with any other previously inputted search criteria) to LBS system 554. In this example, the universal application 552 sends the location (e.g., the stadium) and a service parameters (e.g., board message service) to LBS system 554.

At step 520, LBS system 554 sends the results from the query (i.e., a list of device information) to universal application 552. At step 522, universal application 552 may provide the results to the end user device 550 which displays the search results.

In the example described above, the service attributes are input after search results are received based on location parameters. That is, the service attributes can be input after receiving results of a search based on location parameters. The service attributes can then be used to further narrow search results that have been received based on location parameters. Alternatively, the service attributes can be input before the location parameters are input, and the location parameters can be input after receiving a search result based on the service attributes. Therefore, in the alternative, the location parameters can be used to narrow search results that have been received based on service attributes. Also, in another embodiment, the location parameters and the service attributes can be input at a same time.

At step 524, the end user device 550 may select a registered device 108 from the list provided in the search results after reviewing the list of devices and their device information. In some embodiments, upon receiving an indication that the end user device 550 would like to access a particular registered device, universal application 552 may determine whether the registered has a corresponding web application or mobile application that the end user device 550 may access in order to interact with the selected registered device 108. In certain embodiments, the universal application 552 provides an interface that enables the user to interact with the selected registered device 108, therefore, a separate or corresponding web application or mobile application for the selected registered device may not be necessary.

If the selected registered device has a corresponding web application or mobile application, at step 526, upon receiving the selection of the registered device, universal application 552 may launch a device application 558 by accessing the device application from the application server 556. For example, the list of registered devices provided as a search result may include URL's for applications corresponding to the registered devices. When the end user selects a registered device, that is, when the end user selects a URL for the a registered device (e.g., the end user clicks on the URL) an application corresponding to the selected registered device can be accessed from the application server 556 and launched on the end user device 550 via the universal application 552.

At step 528, the application server 556 may cause the device application 558 to be launched on the end user device 550. By accessing the URL of the selected registered device 108, the end user device 550 (e.g., mobile device) may present the device application for the selected registered device to the end user. At step 530, the end user may then access the selected registered device as needed via device application 558.

At step 532, the device application 558 may be made accessible to end user device 550 and the application UI may be displayed on the end user device 550. At step 534, the end user device 550 may manipulate the UI via device application 558.

In addition, in the example shown in FIG. 5, at step 536, the end user device 550 may be used to make a payment for the services that the user is acquiring through the particular device using device application 558 and the user can access the registered device according to their level of access.

For instance, the user may type in credit card information and a message to be shown on the billboard. A device application for the billboard can include a form to input a text to show on the billboard, a form to input the time when the text should be shown, and a form to input the credit card information for payment, etc. The end user device 550 may be used select the desired information to input in the forms. The end user device 550 may also be used to complete the payment information necessary to engage the services of the registered device 108 (e.g., billboard) through a payment application for the billboard. The end user device 550 may also be used to make additional requests and interact with the selected registered device as needed.

At step 538, the device application 558 may update the UI 538 and display the updated UI to the end user device 550.

Figure 6:
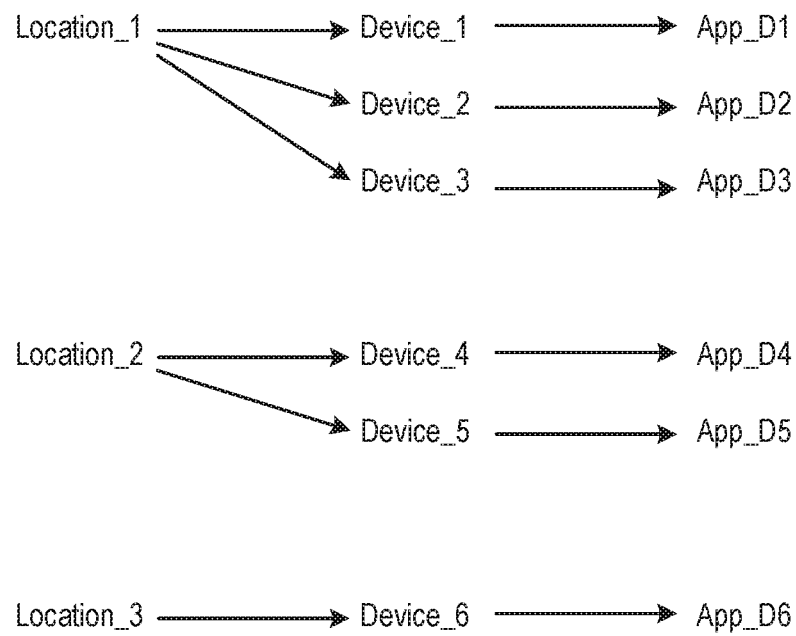
FIG. 6 illustrates an example of a Location Based Services (LBS) system server storing mapping information including a single application for each of a plurality of devices in accordance with some embodiments.
Figure 7:
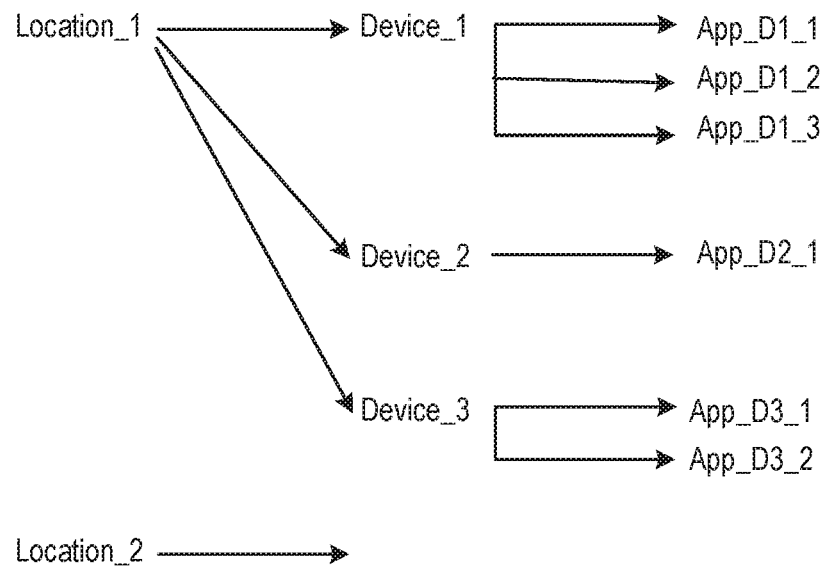
FIG. 7 illustrates an example of a Location Based Services (LBS) system server storing mapping information including a plurality of applications for a single device in accordance with some embodiments.
Figure 8:
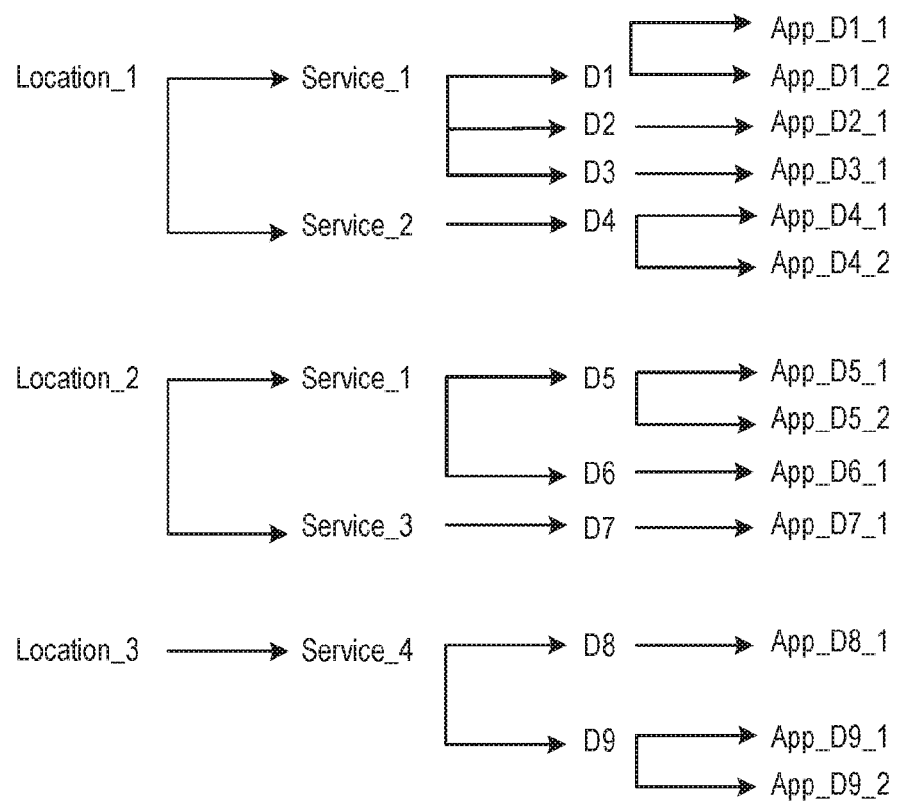
FIG. 8 illustrates an example of a Location Based Services (LBS) system server storing mapping information including one or more applications for a device based on service attributes in accordance with some embodiments.

FIGS. 6, 7 and 8 illustrate various permutations of storing mapping information such as physical location information, device information and device application information in a Location Based Services (LBS) system server. FIG. 6 illustrates an example of an LBS system server storing mapping information including a single application for each of a plurality of devices in accordance with some embodiments. FIG. 7 illustrates an example of the LBS system server storing mapping information including a plurality of applications for a single device in accordance with some embodiments. FIG. 8 illustrates an example of the LBS system server storing mapping information including one or more applications for a device based on service attributes in accordance with some embodiments. The LBS system described in FIGS. 6, 7, and 8 can correspond to LBS system 114 of FIG. 1. In addition, the information that is stored in the LBS system 114 can be stored in, for example, a memory or database (e.g., memory 115 of FIG. 1). As shown in FIGS. 6, 7, and 8, an LBS system can store information regarding locations, devices and their corresponding applications.

As shown in FIG. 6, each registered device can be mapped to a single application for accessing and manipulating the registered device. For example, a Location_1 can include a plurality of registered devices (e.g., Device_1, Device_2, and Device_3, etc.) and each of the plurality of registered devices (e.g., Device_1, Device_2, and Device_3, etc.) can have a single corresponding application (e.g., App_1, App_2 and App_3, etc). If the end user desires to use Device_1, then the corresponding App_1 will be provided to the end user, via for example, an application server, in order for the end user to manipulate Device_1. For example, search results for a selected location (e.g. Location_1) can include a list of URL's corresponding to each of App_1, App_2 and App_3 for Device_1, Device_2, and Device_3, respectively, that are in Location_1. If an end user selects the URL for App_1 of Device_1, then the application for Device_1 can be launched.

As shown in FIG. 7, a single registered device can be mapped to a plurality of applications for accessing and manipulating the registered device. For example, Location_1 can include a plurality of registered devices (e.g., Device_1, Device_2, and Device_3, etc.) and a registered device (e.g., Device_1) can have a plurality of corresponding applications (e.g., App_D1_1, App_D1_2 and App_D1_3, etc). Therefore, if the end user desires to use Device_1, then a plurality of corresponding applications may be provided to the end user in order for the end user to manipulate Device_1. For example, search results for a selected location (e.g. Location_1) can include a plurality of URL's corresponding to each of a plurality of applications (e.g., App_D1_1, App_D1_2 and App_D1_3) for Device_1.

As shown in FIG. 8, the LBS system can store information according to service attributes for a location. Service attributes can be mapped to corresponding registered devices and the registered devices can be mapped to corresponding device applications. For example, a service (e.g., Service_1) for a particular location (e.g., Location_1) can be mapped to one or more registered devices (e.g., D1, D2, and D3) that can perform the service and the registered devices (e.g., D1, D2, and D3) are mapped to their corresponding one or more applications (e.g., App_D1_1, App_D1_2, App_D2_1, App_D3_1, etc.). Similar to FIGS. 6 and 7 described above, a registered device can have a single corresponding device application or a registered device can have a plurality of corresponding device applications.

Therefore, in accordance with some embodiments, given a physical location, a universal application can be used to conduct a search and identify registered devices according to location information and an application (e.g. universal application or device application) for controlling a selected registered device can be provided to an end user. The end user can interact with the selected registered device by using an application for the selected registered device or alternatively by using the universal application.

Figure 9:
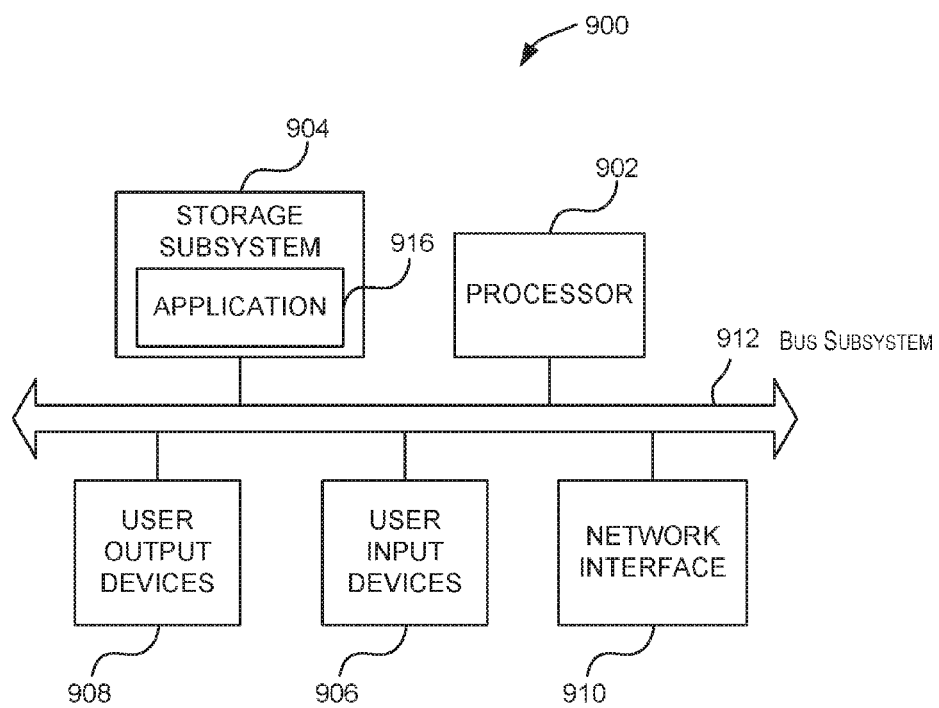
FIG. 9 is a simplified block diagram of an implementation of a computing system according to some embodiments.

FIG. 9 is a simplified block diagram of a computer system 900 that may be used in accordance with certain embodiments. Computer system 900 may be used to implement one or more of the devices described above, such as end user devices 102, LBS system 114, application server 112, registered devices 108 and provider device 120, as depicted in FIGS. 1, 3, and 5. Computer system 900 can be of various types such as, without limitation, a mobile device, a handheld device, a notebook computer, a desktop computer, an IoT device, or any suitable electronic device. Further, while computer system 900 is described with reference to particular blocks, it is to be understood that these blocks are defined for convenience of description and are not intended to imply a particular physical arrangement of component parts. Some embodiments can be realized in a variety of apparatus including electronic devices implemented using any combination of circuitry and software. Due to the ever-changing nature of computers and networks, the description of computer system 900 depicted in FIG. 9 is intended only as a specific example for illustrative purposes. Many other configurations having more or fewer components than the system depicted in FIG. 9 are possible.

As depicted in FIG. 9, computer system 900 includes a number of subsystems including a processing subsystem 902, a storage subsystem 904, a user input subsystem 906, a user output subsystem 908, and a network interface subsystem 910. In the embodiment depicted in FIG. 9, the various subsystems are communicatively coupled to each other via a bus subsystem 912. Bus subsystem 912 provides a mechanism for letting the various components and subsystems of computer system 900 communicate with each other as intended. Although bus subsystem 912 is shown schematically as a single bus, alternative embodiments of the bus subsystem may utilize multiple busses.

Processing subsystem 902, which can be implemented as one or more integrated circuits (e.g., one or more single-core or multi-core microprocessors or microcontrollers), can control the operation of computer system 900. Processing subsystem 902 may include without limitation one or more general-purpose processors and/or one or more specialpurpose processors (such as digital signal processing chips, graphics acceleration processors, sensory chips, and/or the like). The processors may include one or more multicore processors. In various embodiments, processing subsystem 902 can execute a variety of programs (e.g., program code, instructions) that cause various functions to be performed and can maintain multiple concurrently executing programs or processes. At any given time, some or all of the program code to be executed can be resident in processing subsystem 902 and/or in storage subsystem 904.

Through suitable programming, processing subsystem 902 can provide various functionalities for computer system 900. For example, processing subsystem 902 can execute one or more applications 916 installed on computer system 900. Application 916 can perform various methods for various functionalities of an application.

Storage subsystem 904 provides a non-transitory medium for storing information and code (instructions) that can be executed by one or more processing units (e.g., processors) of processing subsystem 902. For example, storage subsystem 904 may be configured to store the basic programming (e.g., application 916) and data constructs that provide the functionality of certain embodiments. Storage subsystem 904 may also provide a repository for storing data used in accordance with some embodiments. For example, configuration data associated with an application may be stored by storage subsystem 904. Programs and/or data can be stored in non-volatile storage and copied in whole or in part to volatile working memory during program execution. Storage subsystem 904 can be implemented, e.g., using disk, flash memory, or any other storage media in any combination, and can include volatile and/or non-volatile storage as desired.

In certain embodiments, storage subsystem 904 may comprise a memory subsystem and a file/disk storage subsystem. The memory subsystem may include a number of memories such as a main random access memory (RAM) for storage of instructions and data during program execution, a read only memory (ROM) in which fixed instructions are stored, flash memory, and the like. In certain embodiments, various software elements may be located within system memory such as an operating system, device drivers, executable libraries, and/or other code, such as one or more application programs 916. The file storage subsystem may provide persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media.

User input devices 906 may include one or more different mechanisms for providing inputs to computer system 900 such as, without limitation, a mouse, a keyboard, a touchpad, a tablet, user-selectable buttons, and/or the like. User input devices 906 can include a touch pad, touch screen, scroll wheel, click wheel, dial, button, switch, keypad, microphone, or the like.

User output devices 908 can include one or more different mechanisms for outputting information from computer system 900, such as, without limitation, a display screen, indicator lights, speakers, headphone jacks, or the like, together with supporting electronics (e.g., digital-to-analog or analog-to-digital converters, signal processors, or the like).

Computer system 900 may include a network interface subsystem 910 that enables and facilitates data communications to and from computer system 900. Network interface subsystem 910 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. Network interface subsystem 910 may permit data to be exchanged with a network, other computer systems, and/or any other devices described herein. For example, if system 900 is used to implement an application sharing system, network interface subsystem 910 may facilitate communications with one or more end user devices. In some embodiments network interface 910 can provide wired network connectivity (e.g., Ethernet). Network interface 910 can be implemented using a combination of hardware (e.g., antennas, modulators/demodulators, encoders/decoders, and other analog and/or digital signal processing circuits) and software components.

The terms "machine-readable medium" and "computer-readable medium," as used herein, refer to any non-transitory medium that participates in providing data that causes a computer system to operate in a specific fashion. In an embodiment implemented using the computer system 900, various computer-readable media might be involved in providing instructions/code to processor(s) 902 for execution and/or might be used to store such instructions/code. Computer-readable medium may take many forms such as non-volatile media and volatile media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing the embodiments. Various changes may be made in the function and arrangement of elements without departing from the spirit and scope of the embodiments.

Although example embodiments have been described, various modifications, alterations, alternative constructions, and equivalents are also. Some embodiments are not restricted to operation within certain specific data processing environments, but are free to operate within a plurality of data processing environments. Additionally, although certain embodiments have been described using a particular series of transactions and steps, it should be apparent to those skilled in the art that the scope of the embodiments is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of the embodiments. Certain embodiments may be implemented only in hardware, or only in software (e.g., code programs, firmware, middleware, microcode, etc.), or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques including but not limited to conventional techniques for inter-process communication, and different pairs of processes may use different techniques, or the same pair of processes may use different techniques at different times.

Any of the software components or functions described in this disclosure may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific exemplary embodiments have been described, these are not intended to be limiting. Various modifications and equivalents are within the scope of the following claims.

A recitation of "a", "an" or "the" is intended to mean "one or more" unless specifically indicated to the contrary.

What is claimed is:

1. A computer-implemented method of enabling access to one or more devices associated with a physical location, the method comprising:
    launching, on a first end user device, a universal application for selecting one or more devices, wherein the universal application enables a user to search for one or more devices registered with a location based services system of the universal application;
    receiving, by the universal application on the first end user device, information identifying the physical location;
    determining, by the universal application on the first end user device, the one or more devices associated with the physical location, and wherein the one or more devices are registered with the location based services system;
    receiving, from the first end user device, a user selection of a first device among the one or more devices associated with the physical location;
    receiving, from the first end user device, a request to launch an application on the first end user device, wherein the application is configured to control the first device that is associated with the physical location and is selected from among the one or more devices associated with the physical location; and
    enabling a first end user of the first end user device to interact with the application configured to control the first device by using the first end user device, wherein the first device is associated with the physical location.

2. The method according to claim 1, further comprising:
    enabling one or more device providers to register the one or more devices;
    receiving device information associated with the one or more devices to be registered, the device information including a device identifier, a device location, and a device capability; and
    storing the device information in a device inventory.

3. The method according to claim 1 further comprising:
providing cost information associated with each of the one or more devices associated with a physical location, and
receiving a payment via the application in exchange for a service provided by the selected first device selected from among the one or more devices.

4. The method according to claim 1, wherein the determining the one or more devices associated with the physical location is performed by a universal application configured to manage the one or more devices and one or more services associated with the one or more devices according to the physical location.

5. The method according to claim 1, wherein the one or more devices associated with the physical location is determined according to stored mapping information.

6. The method according to claim 5, wherein the mapping information maps a plurality of physical locations with a plurality of devices.

7. The method according to claim 5, wherein the mapping information maps a device with one or more device applications for operating the device.

8. The method according to claim 5, wherein the mapping information maps a device with one or more services offered by the device.

9. The method according to claim 7, wherein the one or more device applications are managed by an application server.

10. The method according to claim 1, wherein the information identifying the physical location comprises search parameters input via a universal application operating on the first end user device.

11. The method according to claim 10, wherein the search parameters comprise one of an address, a location name, and a point of interest.

12. The method according to claim 1, wherein the one or more devices are registered intelligent computing devices.

13. The method according to claim 1, wherein the information identifying the physical location comprises one of an address, a location name, and a point of interest.

14. The method according to claim 1, wherein the first device is selected from among the one or more devices by selecting a uniform resource locator (URL) of the first device.

15. The method according to claim 1, wherein the application associated with the first device is launched in the first end user device upon selection of the of the first device from among the one or more devices.

16. The method according to claim 1, wherein the enabling the first end user of the first end user device to interact with the application associated with the first device using the first end user device comprises displaying a user interface for controlling the application on the first end user device.

17. A computer-implemented method of enabling access to one or more devices associated with a physical location, the method comprising:
launching, on a first end user device, a universal application for selecting one or more devices, wherein the universal application enables a user to search for one or more devices registered with a location based services system of the universal application;
receiving, by the universal application on the first end user device, information identifying the physical location;
determining, by the universal application on the first end user device, the one or more devices associated with the physical location, and wherein the one or more devices are registered with the location based services system;
receiving, by the server computing device from the first end user device, information identifying a service attribute;
determining, from among the determined one or more devices associated with the physical location, one or more devices associated with the service attribute;
receiving, from the first end user device, a user selection of a first device among the one or more devices associated with the service attribute;
receiving, from the first end user device, a request to launch an application on the first end user device, wherein the application is configured to control the first device selected from among the one or more devices associated with the physical location; and
enabling a first end user of the first end user device to interact with the application configured to control the first device by using the first end user device, wherein the first device is associated with the physical location.

18. The method according to claim 17, further comprising:
enabling one or more device providers to register the one or more devices;
receiving device information associated with the one or more devices to be registered, the device information including a device identifier, a device location, and a device capability; and
storing the device information in a device inventory.

19. A system comprising:
a memory; and
one or more processors coupled to the memory and configured to:
launch, on a first end user device, a universal application for selecting one or more devices, wherein the universal application enables a user to search for one or more devices registered with the system;
receive, by the universal application on the first end user device, information identifying a physical location;
determine, by the universal application on the first end user device, one or more devices associated with the physical location, and wherein the one or more devices are registered with the system;
receive, from the first end user device, a user selection of a first device among the one or more devices associated with the physical location;
receive, from the first end user device, a request to launch an application on the first end user device, wherein the application is configured to control the first device selected from among the one or more devices associated with a physical location; and
enable a first end user of the first end user device to interact with the application configured to control the first device by using the first end user device, wherein the first device is associated with the physical location.

20. The system according to claim 19, further comprising one or more processor configured to:
enable one or more device providers to register the one or more devices;
receive device information associated with the one or more devices to be registered, the device information including a device identifier, a device location, and a device capability; and
store the device information in a device inventory.

21. The system according to claim 19, wherein the system is a location based services system.

* * * * *

UNITED STATES PATENT AND TRADEMARK OFFICE
CERTIFICATE OF CORRECTION

PATENT NO. : 10,028,086 B2  
APPLICATION NO. : 15/046359  
DATED : July 17, 2018  
INVENTOR(S) : Makoto Iguchi, Phani Pandrangi and Susumu Ishizuka Page 1 of 1

It is certified that error appears in the above-identified patent and that said Letters Patent is hereby corrected as shown below:

In the Claims

In Claim 17, Column 24, Line 1 – delete "receiving, by the server computing device from the first" and insert --receiving, by a server computing device from the first--

Signed and Sealed this  
Seventh Day of May, 2019

Andrei Iancu  
*Director of the United States Patent and Trademark Office*